April 9, 1957 W. WHALEY 2,788,076
CONVEYOR TYPE LOADING MACHINES
Filed Jan. 21, 1952 7 Sheets-Sheet 1

INVENTOR
William Whaley
BY *Cyrus Kehr & Sunckes*
ATTORNEYS

April 9, 1957 W. WHALEY 2,788,076
CONVEYOR TYPE LOADING MACHINES
Filed Jan. 21, 1952 7 Sheets-Sheet 2
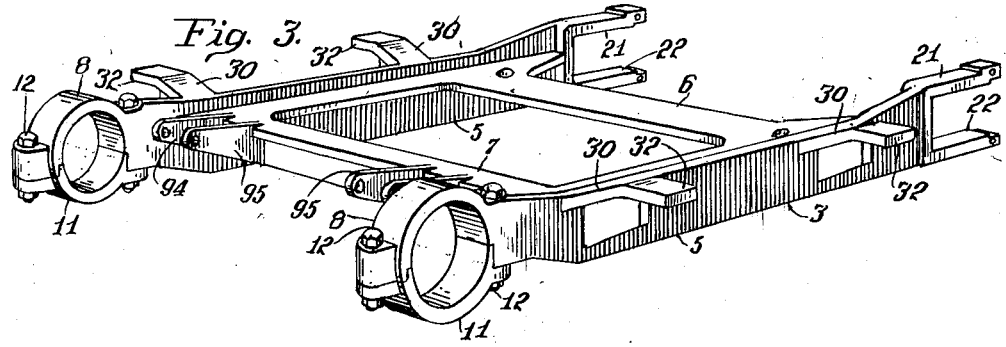
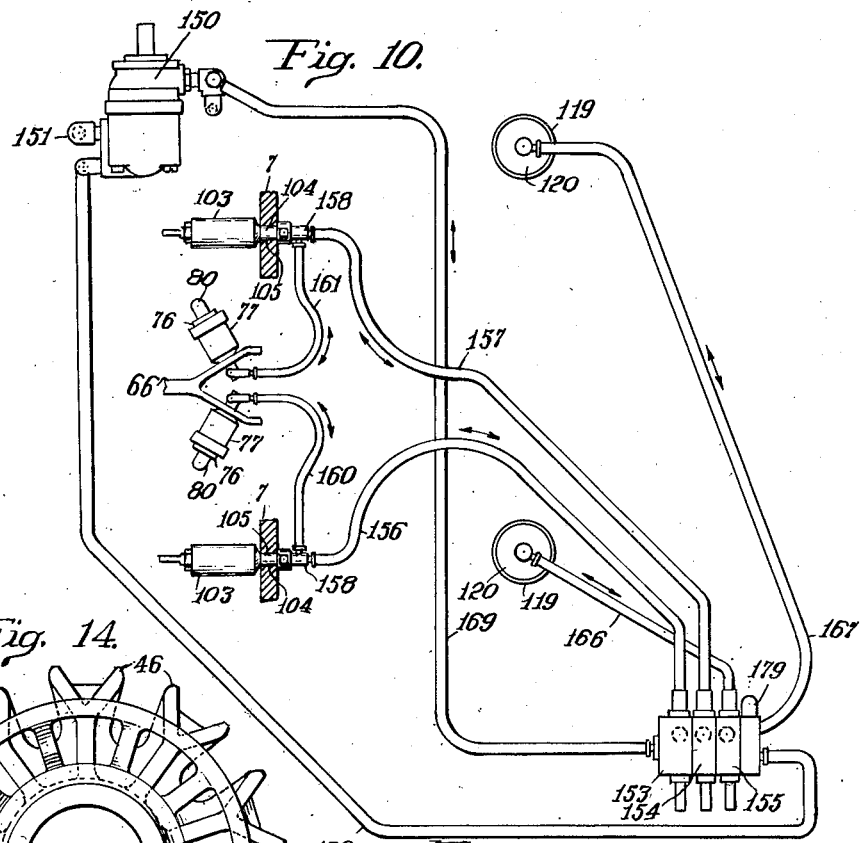
INVENTOR
William Whaley
BY
ATTORNEYS April 9, 1957  W. WHALEY  2,788,076
CONVEYOR TYPE LOADING MACHINES
Filed Jan. 21, 1952  7 Sheets-Sheet 3
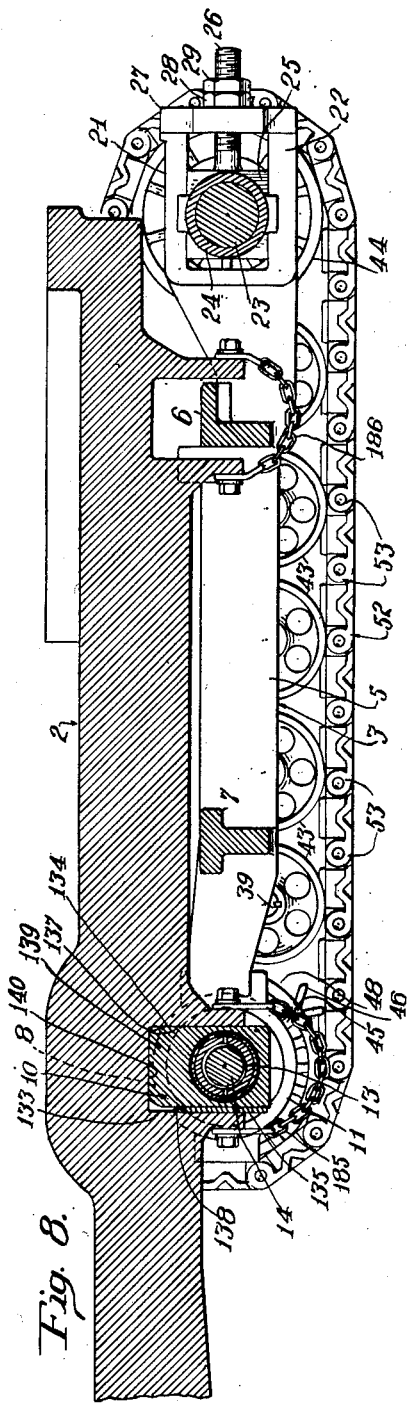
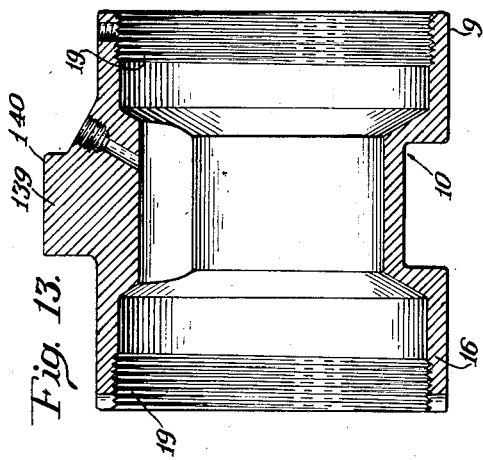
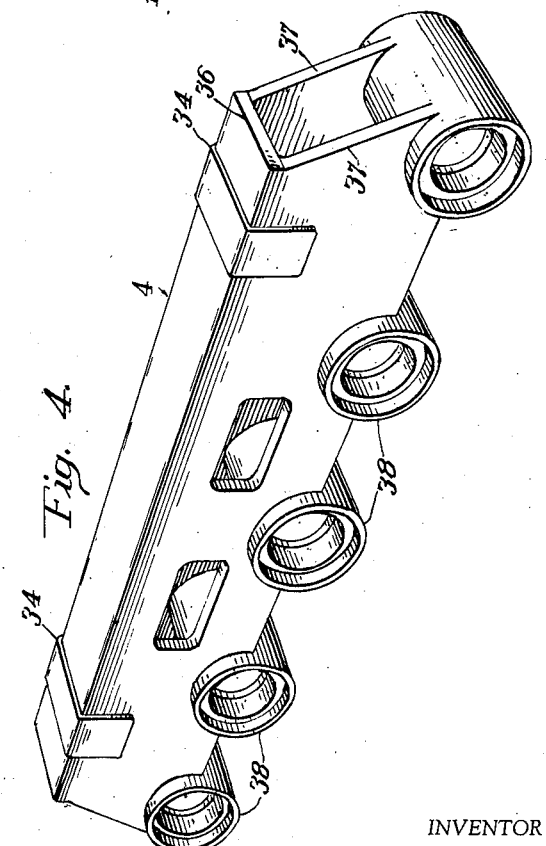
INVENTOR
William Whaley
BY
ATTORNEYS

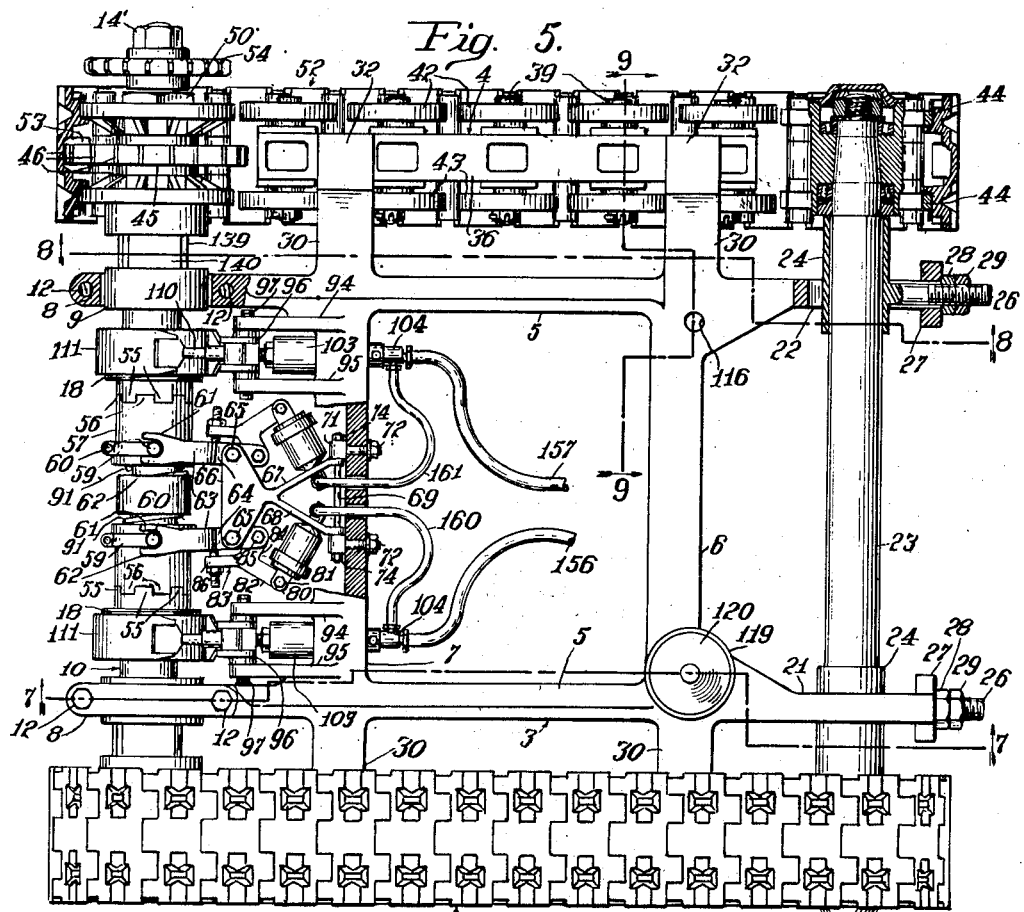

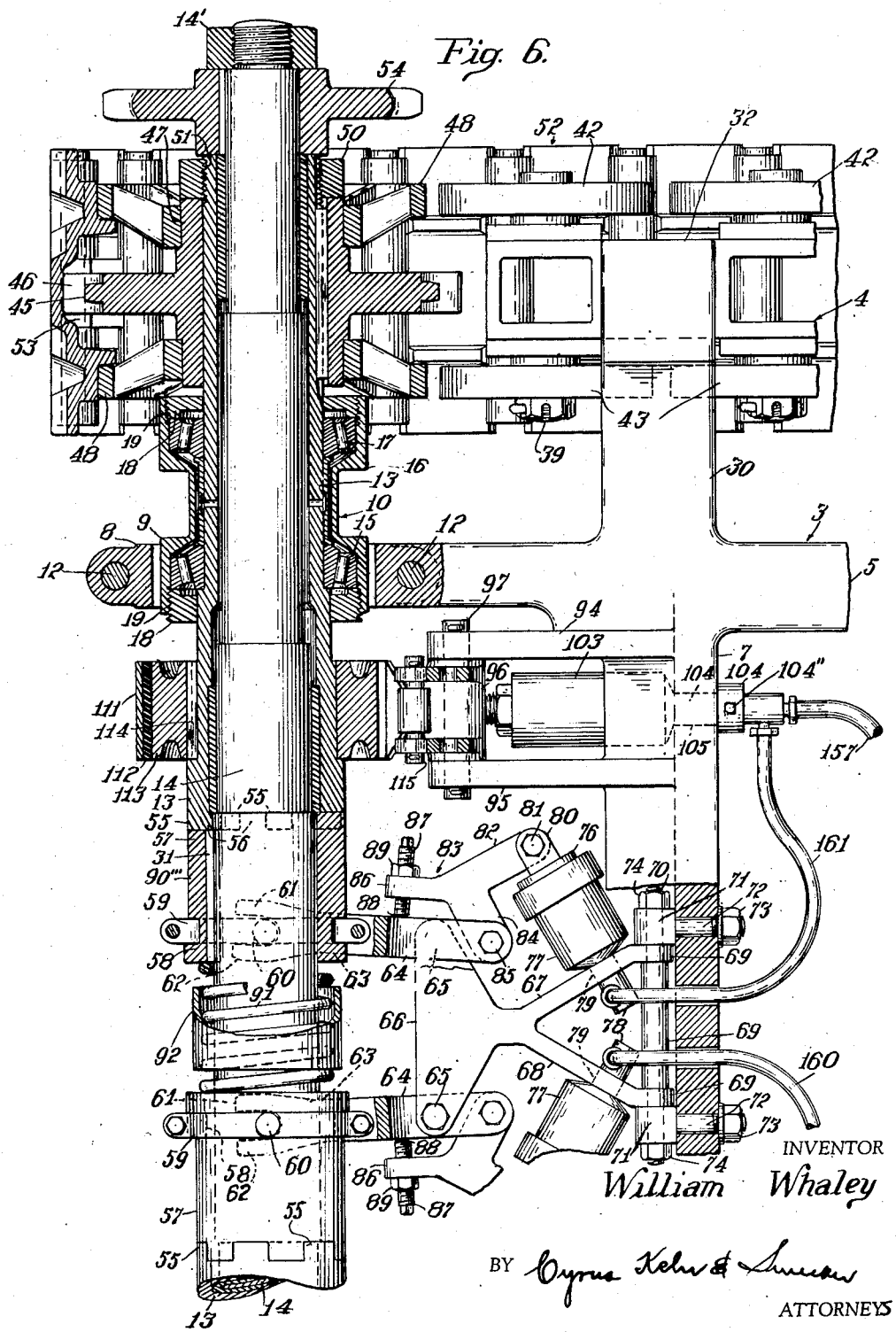

April 9, 1957 W. WHALEY 2,788,076
CONVEYOR TYPE LOADING MACHINES
Filed Jan. 21, 1952. 7 Sheets-Sheet 6
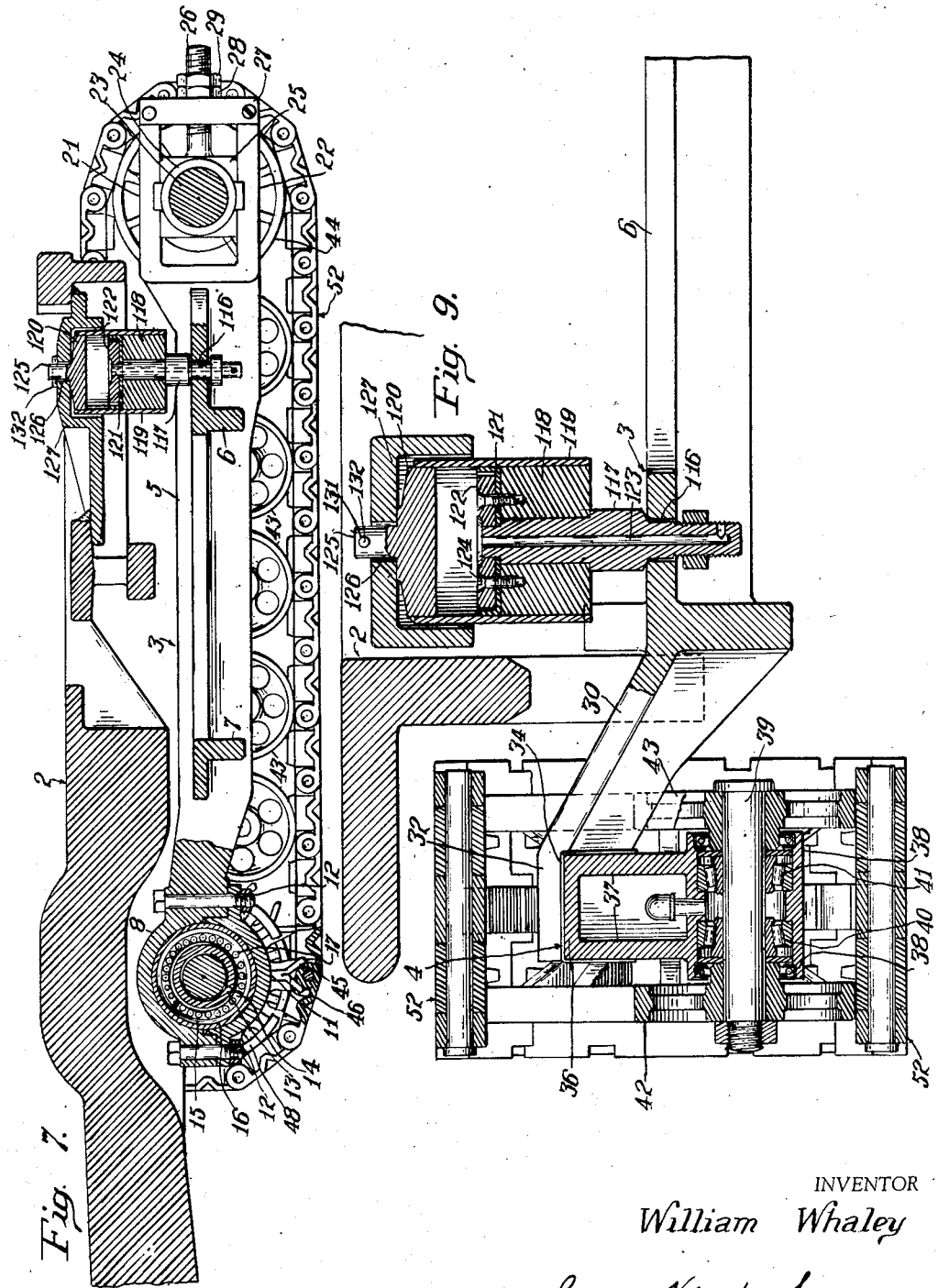
INVENTOR
William Whaley
BY
ATTORNEYS April 9, 1957   W. WHALEY   2,788,076
CONVEYOR TYPE LOADING MACHINES
Filed Jan. 21, 1952   7 Sheets-Sheet 7

INVENTOR
William Whaley
BY
ATTORNEYS

United States Patent Office 2,788,076
Patented Apr. 9, 1957

2,788,076

CONVEYOR TYPE LOADING MACHINES

William Whaley, Knoxville, Tenn.

Application January 21, 1952, Serial No. 267,324

7 Claims. (Cl. 180—6.7)

This invention relates to improvement in loading machines, finding utility in the shoveling of coal, loose rock and other analogous materials, and discharging such material into other vehicles for transportation to a given destination. The present invention comprises an improvement of my earlier loading machines, some of which were described and illustrated in United States Letters Patent No. 940,999, dated November 23, 1909; No. 1,379,428, dated May 24, 1921; No. 1,814,067, dated July 14, 1931; and No. 2,437,629, dated March 9, 1948.

Machines of this general type embody a main frame on which the forward end or jib, carrying the loading machines, is mounted for transverse movement. The main frame additionally supports a rear conveyor which is also mounted for transverse movement. In such machines, the component elements of the loader are supported on track wheels adapted for forward and backward movement on a pair of rails or mine tracks.

The present invention is to provide means for supporting such a machine for travel and operation on the ground where desirable to do so, as when loading into trucks or other vehicles which operate on the ground, and to retain in such trackless or ground mounted machines all the advantages of the track mounted loading machine. To this end it is proposed to support the loading machine on a sub-frame, sub-assembly or unit having traction devices of the caterpillar or crawler type with improved characteristics. This sub-frame is complete in itself so that existing machines may be applied to the same for conversion from track operation to trackless operation—or machines built with this sub-assembly for trackless operation may be converted readily to track operation.

A further object of this invention is to provide for vertically adjusting the forward end of the main frame when it becomes necessary to travel over uneven ground, and which also provides an additional vertical adjustment for the shovel when the same is operated over an uneven floor.

Other and further objects and advantages of this invention will become apparent from a consideration of the following specification when read in the light of the annexed drawings, in which:

Fig. 3 is a perspective view of the center frame of the sub-assembly;

Fig. 4 is a perspective view of one of the roller side frames;

Fig. 5 is a top plan view of the center frame and its associated elements, the main frame and loading mechanisms supported thereon having been removed;

Fig. 6 is an enlarged partial top plan view of the center frame showing the details of the driving, steering and braking mechanisms in cross section;

Fig. 7 is a longitudinal sectional view taken on the line 7—7 in Fig. 5;

Fig. 8 is a longitudinal sectional view taken on the line 8—8 in Fig. 5;

Fig. 9 is a transverse cross section taken on the line 9—9 in Fig. 5;

Fig. 10 is a schematic representation of the hydraulic system employed for the steering and braking of the loading machine as well as serving the lifting means for the main frame;

Fig. 11 is an enlarged exploded cross sectional detail view of one of the driving clutches shown in Fig. 5;

Fig. 12 is an enlarged elevational view, partly in cross section, illustrating details of the braking mechanism;

Fig. 13 is an enlarged longitudinal sectional view through one of the rear axle box housings;

Fig. 14 is a side elevation of a drive sprocket;

Figures 1, 2:
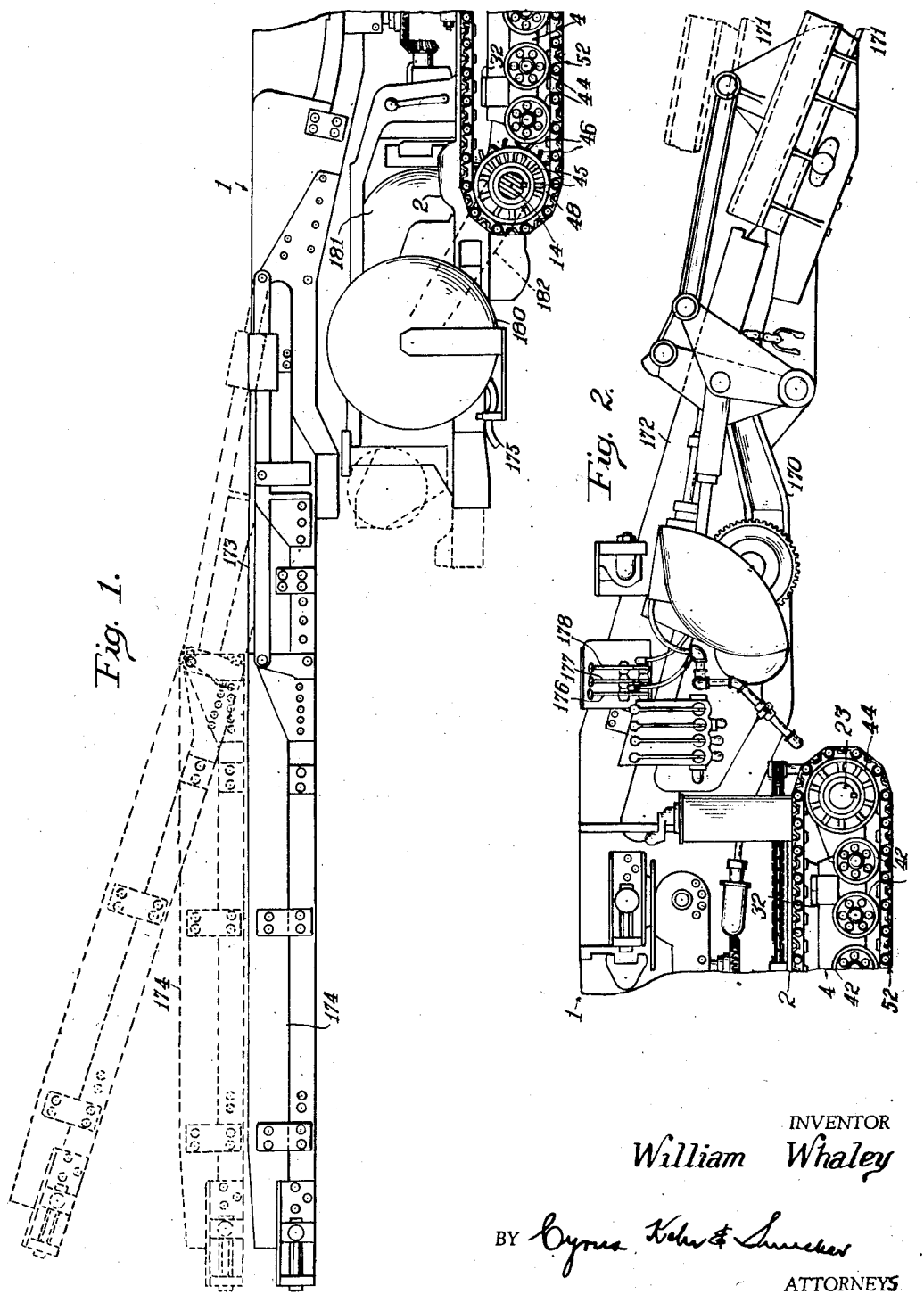
Fig. 1 is a side elevation of substantially the rear half of a loading machine constructed in accordance with the teachings of this invention.
Fig. 2 is a side elevation of substantially the forward half of the loading machine.

Referring now more specifically to Figs. 1, 2 and 5 of the drawings, reference numeral 1 illustrates a loading machine constructed in accordance with the teachings of this invention, and includes a main frame 2, and a sub-assembly. The sub-assembly comprises a center frame 3 and a pair of oppositely disposed side frames 4 (see Figs. 3 to 9, inclusive), together with their component parts.

*The subassembly*

As is seen in Fig. 3 of the drawings, the center frame 3 is substantially rectangular in configuration and comprises a pair of spaced, substantially parallel side members 5 connected adjacent their respective front and rear ends by the cross braces 6 and 7, respectively. Each of the side members 5 projects rearwardly of the rear cross brace 7 and terminates in substantially one-half of an arcuately shaped split bearing 8; which rests on an inner end 9 (see Figs. 5, 6 and 7) of a rear axle journal box 10. A split bearing 8 is provided at each end of the axle, and these bearings are secured on the journal boxes 10 by complementary split bearing sections 11 and co-acting bolts 12. For reasons which will become apparent, the axle journal boxes 10 are rotatable in the split bearings 8.

An elongated tubular sleeve 13 (see Fig. 6) is mounted on each end of an elongated drive shaft 14 which extends transversely across the subassembly. Each of the tubular sleeves 13 extends through the adjacent rear axle box 10 and is journaled therein within bearings 15 mounted within the enlarged inner end 9 of the axle box 10, and within bearings 17 mounted in enlarged outer end 16 of the axle box 10. A pair of bearing lock nuts 18 are threaded at 19 into the inner and outer open ends of each rear axle box 10 and retain the adjacent bearings therein.

The side members 5 extend forwardly beyond the front cross brace 6 of the center frame 3 (see Figs. 3, 5, 7 and 8) and terminate in bifurcated ends having spaced, parallel and substantially horizontal furcate arms 21 and 22 forming front axle bearing supports.

A front axle 23 extends completely across the subassembly and is journaled in bearing sleeves 24 disposed within longitudinally shiftable bearing blocks 25 mounted within the bifurcated ends 21 and 22 of the front axle bearing supports. Crawler take up and axle aligning means are provided for the front axle 23 and comprise a shaft 26 which projects forwardly from each of the bearing blocks 25 and extends through a front plate 27 connected across the bifurcated ends 21 and 22 of the front axle supports. The outer end of each shaft 26 is threaded to receive adjusting and lock nuts 28 and 29, respectively.

Reference is now made to Figs. 3 and 5, wherein it is seen that each of the side members 5 is provided with a pair of longitudinally spaced, laterally extending, suspension members 30, which are integral with the substantially horizontal offset end portion 32 thereof. The offset portions are rigidly secured, as by welding, to reinforced sections 34, on the upper wall 36 of each side frame 4 (see Fig. 4).

Each side member 4 is provided with a pair of spaced parallel side walls 37 which depend from the upper wall 36. As seen in Fig. 4, a plurality of transverse roller axle housings 38 are integrally formed with the side walls 37, and are spaced along the length thereof.

A roller shaft 39 (Figs. 5, 6 and 9) extends through each of the roller axle housings 38 and is journaled therein by conventional anti-friction bearings 40 and 41. Roller wheels 42 and 43 are secured on each end of each shaft 39 adjacent each of the side walls 37 of the side member 4.

An enlarged roller wheel 44 is mounted on each end of the front axle 23, and an enlarged sprocket wheel 45 having teeth 46 and an elongated hub 47 (Fig. 6) is mounted on the outer end of each sleeve 13. Roller wheels 48 are mounted on and secured to the hub 47 at each side of the sprocket wheel 45. The combined sprocket and roller wheels 45, 48 are secured for rotation with the tubular sleeves 13 by keys and are confined on the sleeves by nuts 50 threaded at 51 on the outer ends of the tubular sleeves 13.

An endless crawler traction chain 52 is trained around the roller and sprocket wheels 45, 48, at each side of the subassembly. As is seen in Figs. 5 and 6, the individual links of the chain 52 are provided with inwardly projecting trunnions 53 which successively mesh with the sprocket wheel teeth 46 as the drive shaft 14 is driven, thereby causing the traction chain 52 to travel in a substantially orbital path relative to the loading machine 1.

A sprocket wheel 54 is mounted on one of the outer ends of the drive shaft 14 and is keyed thereto. Endwise displacement of the sprocket wheel 54 is prevented by a nut 14' threaded on the outer end of the drive shaft 14. The sprocket wheel 54, and consequently the drive shaft 14, is driven by a chain 182 from a driving mechanism on the main frame 2.

*Driving, steering and braking*

The driving, steering and braking of the loading machine 1 is effected through the actuation of a plurality of hydraulically operated brakes and clutches. In order to establish a driving relationship between the power means and the drive sprockets 45, the inner end of each sleeve 13 is provided with clutch teeth 55 which mesh with the clutch teeth 56 formed on the adjacent ends of slidably mounted clutch sleeves 57. The clutch sleeves 57 are shiftable longitudinally of the axis of the drive shaft 14 and are keyed thereto at 31 for rotation therewith. The driving relationship of these parts is shown in Fig. 6 and it becomes manifest that the rotation of the sprocket 54 will drive the shaft 14, the clutch sleeves 57, the sleeves 13 and the sprockets 45. Since the outer ends of the sleeves 13 are connected with the driving sprocket wheels 45 which are mounted on and keyed to the sleeves 13, the traction chains 52 will be driven thereon.

To provide means for disengaging the clutch elements 55, 57, circumferential grooves 58 are formed in the clutch sleeves 57 adjacent their outer ends to receive collars 59 having abutment pins 60 projecting therefrom. The pins 60 are embraced between furcate arms 61, 62 of bifurcated ends 63 of links 64. The links 64 are pivotally connected at 65 intermediate their ends to one end and at opposite sides of a bracket 66. A pair of diverging supporting arms 67, 68 project forwardly from the bracket 66 and are integrally connected at their outer ends with a spacer collar 69. A bolt 70 passes through the spacer collar 69 and through eyes 71 of eye-bolts 72 mounted adjacent each side of the divergent arms at their respective forward ends. The shank of each eye-bolt 72 passes through the rear cross brace 7 and is secured thereto by nut 73. Shifting of the bolt 70 in the direction of its longitudinal axis is prevented by lock nuts 74 threaded on the opposite ends thereof.

Hydraulically operated pistons 76 are slidably mounted within cylinders 77 which have tubular connectors 78 of reduced diameter projecting from one end thereof. The tubular connectors pass through openings 79 formed in the bracket supporting arms 67 and 68, and conventional means are employed to secure rigidly the tubular connectors 78 with their respective arms.

A piston rod 80 is fixedly secured to each of the pistons 76, and its other end is pivotally connected at 81 with one of the arms 82 of a bell crank lever 83. The second arm 84 of each bell crank lever 83 is pivotally connected at 85 with the outer end of the link 64. The third arm 86 of the bell crank lever 83 is threaded to receive an elongated threaded adjustment bolt 87 having an end 88 which bears against the link 64 on that side of the pivot connection 65 adjacent the bifurcated end 63. The bolt 87 is maintained in its adjusted position by a lock nut 89.

It should now be clear that as either of the pistons 76 and its piston rod 80 is moved outwardly away from the cylinder 77, the arms 82, 84 and 86 of the bell crank lever 83 will rotate to slide the corresponding sleeve 57 inwardly toward the other sleeve 57 on the shaft.

As seen in Fig. 6, the clutch collar pin 60 is engaged by the bifurcated end 63 of the lever link 64, and the clutch teeth 56 of the clutch sleeve 57 are disengaged by movement of the lever 64 as will be next described. However, only one such clutch sleeve is moved at any time, the opposite or other clutch remains in engagement. The construction is purposely so made that only one clutch 57 can be so disengaged at any time, and such disengagement is to disconnect the drive to the traction chains (or treads) on one side of the machine for steering to that side as the other side continues to be driven.

The disengagement of the clutch teeth 56 of the clutch sleeves 57 from the teeth 55 formed on the sleeves 13 is effected by fluid pressure, supplied by a hydraulic system to be described, acting selectively on the pistons 76. To effect a re-engagement of the clutch elements the pressure on the piston 76 is removed whereupon a helical spring 91 mounted on the shaft 14 and under tension between the adjacent ends of the clutch sleeves 57 urges the clutch sleeves 57 toward the sleeves 13 to cause the clutch teeth 56 to re-engage with the teeth 55 of the sleeve 13.

The spring 91 is surrounded by a collar 92 disposed loosely between the adjacent ends of the clutch sleeves 57. The collar 92 has a length less than the distance between the adjacent ends of the clutch sleeves 57 to permit, and at the same time to limit, the movement of the clutch sleeves toward each other.

Thus it is seen that the traction chains 52 on either side of the loading machine 1, may be driven individually through the selective operation of either of the hydraulic cylinders 77.

The braking mechanism comprises a pair of spaced bracket arms 94 and 95, which project rearwardly from the rear cross brace 7 adjacent each side of the center frame 3. A bell crank lever 96 is pivotally mounted between each pair of bracket arms 94 and 95 on a pin 97 which passes through the opening 98 (see Fig. 12) of the bell crank lever 96, and which pin 97 is supported at its opposite ends in each pair of bracket arms.

Each of the bell crank levers 96 has a depending arm 99 which is pivotally connected at 100 with one end of a piston rod 101. The other end of the piston rod 101 is rigidly affixed to a hydraulically operated piston 102 which is slidably mounted in cylinder 103. One end of the cylinder 103 has a tubular extension 104 which is received within an opening 105 in the rear cross brace 7. A collar 104' and set screws 104'' are mounted on the extension 104 to secure and support the cylinder 103 on the rear cross brace 7.

A socket 106 (see Fig. 12) has one of its ends pivotally connected at 107 to a second arm 108 of the bell crank lever 96. The socket is internally threaded at 109 to receive an externally threaded bolt end 110 of a brake band 111 formed of flexible resilient metal. The brake band 111 is lined at 112 and is in juxtaposition with respect to a brake drum 113 which is keyed at 114 to the sleeve 13. The other end of the brake band 111 is pivotally connected at 115 to the third arm 115' of the bell crank lever 96.

Thus it is seen that as the piston rod 101 is moved under hydraulic pressure to the left, as viewed in Fig. 12, the arm 115' will pivot clockwise upwardly to effect an engagement of the brake lining 112 with the brake drum 113. When the pressure is released the resiliency of the brake band exerts a force on the bell crank lever 96 in the opposite direction whereby the arm 115' pivots downwardly to cause the brake band 111 and lining 112 to move away from and release the brake drum 113.

The hydraulic system to be described provides for the declutching operation described above to take place simultaneously with the operation of the hydraulic brake operating means, and the latter, at each side of the loading machine 1, is operated independently of the other. To steer the loading machine to either side, for example to the right, the braking on the right hand side of the loading machine 1 is actuated to stop or slow the rotation of the sleeve 13 on the right hand end of the drive shaft 14 at the same time the clutch sleeve 57 and teeth 56 are disengaged, whereby the traction chain 52 on the left hand side will turn the loading machine 1 about the traction chain 52 at the right hand side. In the same manner, actuation of the left hand clutch and brake will turn the loading machine 1 to the left. The disconnection of either side of the machine is independent, and only one side can be disconnected at a time. When both clutches are engaged, of course, the machine travels forward or backward on both tubular shafts, and their sprockets travel with the through shaft 14. When one of the clutches is disengaged and its adjacent brake is simultaneously applied, the machine then steers to that side.

*Main frame adjustment*

To provide additional vertical adjustment of the shovel end desirable in a machine mounted on the ground instead of on track rails, this invention contemplates the provision of means for vertically adjusting further the shovel 171 in addition to the adjusting means disclosed in my prior patents by tilting or pivoting the machine on the rear axle. To provide such means openings 116 are formed in the front cross brace 6, adjacent each of the side members 5, to receive the lower ends of the tubular piston rods 117 (see Fig. 9) having passages 123 therein. The upper ends of the piston rods 117 are centrally connected to enlarged substantially cylindrical pistons 118 which are normally enclosed by cylinders 119, having closed end walls 120. Liquid tight seals or packing rings 121 are secured to the pistons 118 at their peripheries and are maintained in position by the rings 122 secured to the pistons 118 by screws 124. The cylinders 119 are slidable bodily relative to the pistons 118 and are actuated by a hydraulic system referred to below.

Each of the closed cylinder ends 120 has a vertically extending boss 125 which passes loosely through an opening 126 in the main frame 2 adjacent the front end thereof and is centrally positioned at the top of an inverted pocket 127 (see Figs. 7 and 9), integrally formed in the main frame. The upper end of the cylinder 119 and its end wall 120 project loosely within the pocket 127.

The upper end of the boss 125 is transversely bored at 131 to receive a lock pin 132 to prevent the detachment of the cylinder 119 from the main frame 2.

Referring now to Figs. 8 and 13, it is seen that each of the rear axle housing boxes 10 is constructed with an intermediate portion which includes a raised boss 139 having a substantially flat, rectangular top 140 which connects at right angles with front and rear side walls 137 and 138 contained in spaced parallel planes. This intermediate portion of the axle housing box 10 is received within an inverted U-shaped recess 133 formed at each side of the main frame 2, the top 140 of the axle housing box engaging the base 136 of the recess, and the front and rear sides 134 and 135 of the latter being juxtaposed with respect to the front and rear side walls 137 and 138 of the axle housing box.

From the foregoing it now becomes clear that if fluid under pressure be supplied within the hydraulic cylinders 119, the main frame 2 and the rear axle housing boxes 10 will turn in the split bearing housing 8, 11 about the drive shaft 14 as the front end of the main frame 2 swings upwardly.

The shovel 171 (Fig. 2) is supported on the forward end of a jib 170 mounted on the main frame 2 in the manner disclosed in my prior patents, and hence, the pivotal movement described above provides additional means for vertically adjusting the position of the shovel.

The main frame 2 is retained on the subassembly by limit chains 185, 186 (Fig. 8). The chain 185 limits the movement of the axle boxes 10, and chain 186 limits the movement of the cross member 6. These chains are detachably secured to the main frame by set screws to provide for removal if desired.

Figure 15:
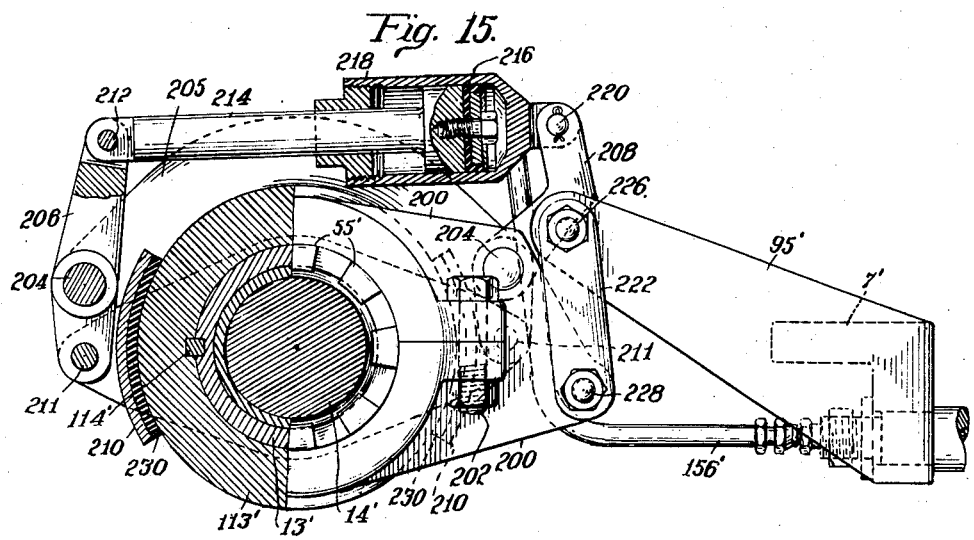
Fig. 15 is a side elevation, partly in cross section, illustrating details of a modification of the braking mechanism.
Figure 16:
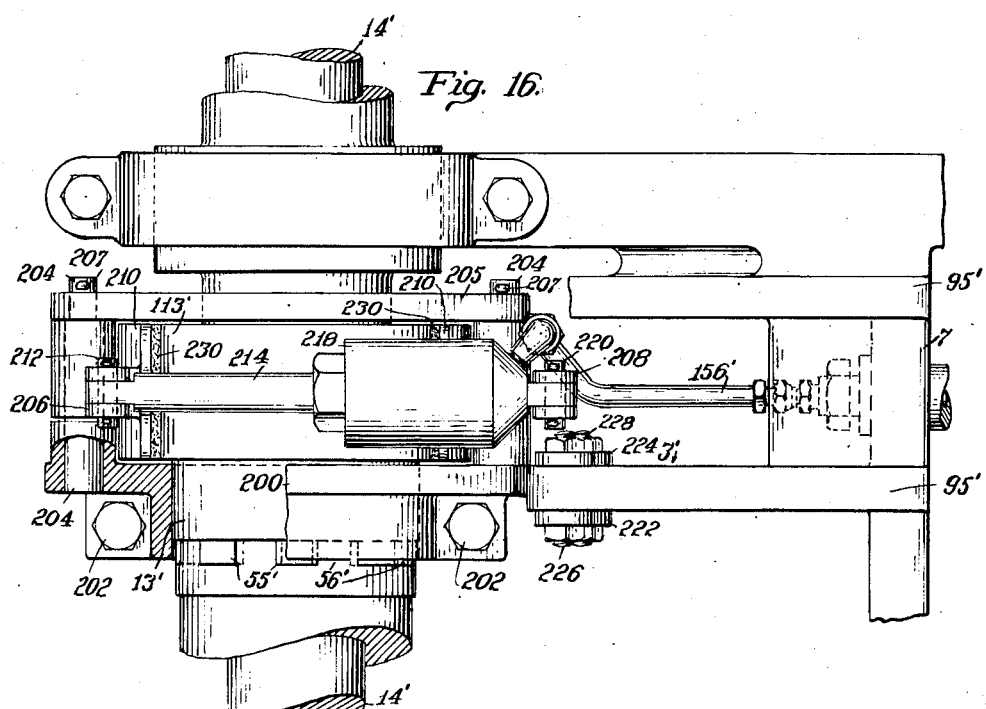
Fig. 16 is a top plan view of the braking mechanism shown in Fig. 15.

A modification of the braking mechanism is disclosed in Figs. 15 and 16 of the drawings. In these figs. the elements which find their counter-parts in the above-described mechanism have been assigned the same reference numbers with the addition of a prime mark.

In the modification, a split hanger plate 200 is bored to fit loosely on the sleeve 13', and the two portions of the hanger plate are secured together by the two bolts 202. As will be seen, in this embodiment of the invention the hanger plate 200 supports the entire braking mechanism.

Referring now to Fig. 16, two spaced and substantially parallel pins 204 project laterally away from the split hanger plate 200 and extend across the width of the brake drum 113'. The outer ends of the pins 204 are connected by a stiffening plate 205, the axial displacement of which from the pins 204 is prohibited by the cotter pins 207 which extend transversely across the longitudinal axis of the pins 204.

Each of the pins 204 serves as a pivot for a pair of rock levers 206 and 208, respectively, intermediate their ends, and a brake shoe 210 is pivotally connected on the pin 211 to the lower end of the rock levers 206 and 208. The upper end of rock lever 206 is pivotally connected at 212 with one end of a hydraulically operated piston rod 214. The other end of the piston rod 214 is integrally formed with a piston 216, slidably mounted within a cylindrical casing 218. As is seen in Fig. 15, the upper end of the rock lever 208 is pivotally connected at 220 with one end of the cylindrical casing 218.

As has been described in the first embodiment discussed above, fluid under pressure is admitted and discharged from the interior of the cylinder 218 through the conduit 156' to actuate the piston rod 214.

Referring again to Figs. 15 and 16, it is seen that the split hanger plate 200 is supported on the bracket arm 95' which projects rearwardly from the cross brace 7' of the subframe 3'. The supporting means comprise a pair of links 222 and 224 pivotally connected at their upper ends on pin 226 to the bracket arm 95'. The lower ends of the links 222, 224 are pivotally connected to the lower section of the split hanger plate 200 on a pivot pin 228. By virtue of the pivotal connections of the split hanger plate 200 with the bracket arm 95', rotation of the hanger plate 200 is effectively prevented.

It will thus be understood that with the application of fluid under pressure into the cylinder 218, the piston rod 214 and the cylinder 218 will move relatively away from each other. This actuation exerts pressure between the upper ends of the rock levers 206, 208, and the lower ends of the rock levers will pivot inwardly causing the brake shoes 210 and lining 230 thereof to move inwardly toward and to engage the brake drum 113' to prevent or stop rotation of the brake drum on the sleeve 13'.

The hydraulic system

Reference has been made above to a hydraulic system for effecting the actuations of the several hydraulically operated pistons. This system is illustrated diagrammatically in Fig. 10 of the drawings wherein reference numeral 150 designates a pump which supplies fluid under pressure to various loading machine elements carried by the main frame 2 through the connection 151. Since this invention does not pertain to these elements or their functions a further description thereof is deemed unessential.

A second pressure line 152 is connected with a bank of valves 153, 154 and 155. The valves 153 and 154 are two-way valves, and the outlets of these valves are connected through conduits 156 and 157 with the inlet couplings 158 of the cylinders 103 to supply fluid under pressure to the pistons 102 in order to actuate the brake bands 111. As seen in Figs. 6 and 10, the couplings 158 are also connected with the cylinders 77 of the clutch operating devices through conduits 160 and 161.

In operation, when either the valve 153 or 154 is moved to its open position, fluid under pressure is supplied through conduits 152, 156 or 157, 160 or 161, to the hydraulic cylinder 77 to actuate the piston 76 whereby the rod 80 (Fig. 6) is moved outwardly to declutch the connected clutch sleeve 57 from its respective sleeve 13. As this operation takes place, fluid under pressure to the hydraulic cylinder 103 actuates to operate the brake band 111 for engagement with the brake drum 113. The operation will be the same for either side according to which of the valves 153 or 154 is opened.

When it is desired to release the brake and reclutch, either of valves 153 or 154 is moved to its respective second position, permitting fluid to drain from the corresponding hydraulic braking cylinder 103 through conduit 156 or 157 to the suction side of the pump 150 through the valves 153 or 154 and conduit 169. Simultaneously, the fluid drains from the hydraulic clutch operating cylinders 77 through the conduits 160, 156 and 161, 157 to the suction side of the pump 150 through the valves 153 and 154 and conduit 169.

The front lift cylinders 119 are actuated through the two-way valve 155 which, when moved to its open position, permits fluid under pressure to enter the front lift cylinders through conduits 166, 167 and the passages 123 formed in the piston rods 117. When it is desired to lower the main frame 2, the valve 155 is moved to its second position permitting the return of the fluid through the passages 123 and the conduits 166 and 167, to the suction line of the pump 150.

A relief valve 179 in the pressure inlet to the valves prevents excessive pressure on the valves and system. The pump 150 draws its supply from a fluid reservoir (not shown) on the main body of the loading machine.

The main frame

The main frame 2 supports the loading mechanism which includes a jib 170 having a shovel 171 mounted on its forward end disposed adjacent a front conveyor section 172, which in turn connects with a rear conveyor section 173 having a vertically adjustable outer discharge end 174. The various controls and eelments utilized in the operation of the loading machine 1 are also mounted on the main frame and are set forth with particularity in my Patent No. 2,437,629. Hence, the details thereof will not be described herein.

The main frame also supports a cable reel 180 which is connected at one of its ends 175 with a source of power. The other end of the cable 175 is connected with a motor 181 which supplies power to the operating parts of the machine and to the drive sprocket 54 and through suitable connections supplies power for the operation of the fluid pressure pump 150. Control levers 176, 177 and 178 for the valves 153, 154 and 155 are conveniently located for the operator and are mounted on the jib 170.

While the invention is described as applied to a loading machine, it will be understood that it may be applied to supporting and traction means for other types of machines, as coal cutting machines, conveyors, transfer cars, etc.

Having described my invention in detail, it will be understood that the embodiment herein described and illustrated is offered only by way of an example, and that the invention is to be limited only by the scope of the following claims.

I claim:

1. A loading machine having a pair of elongated, spaced, parallel and normally vertical side members, a center frame extending between said side members and secured thereto, traction means supported on said side members, a journal box mounted for rotation on said center frame at one end and at each side thereof, a shaft journaled in said journal boxes extending transversely of said center frame, an elongated main frame, means connecting one end of said main frame with each of said journal boxes, means adjacent to and intermediate the other ends of said frames and coacting therewith to pivot said main frame upwardly about said shaft, and power means on said main frame connected with said traction means.

2. A loading machine having a pair of elongated, spaced parallel and normally vertical side members, a center frame extending between said side members and secured thereto, traction means supported on said side members, an axle journal box mounted for rotation relative to said center frame adjacent each side and at one end thereof, an elongated tubular sleeve mounted for rotation within each of said journal boxes, a drive shaft disposed within said sleeves, said drive shaft extending transversely of said center frame, means connecting said sleeves with said traction means, clutch means connecting said drive shaft with said sleeves, means connecting one end of a main frame on said journal boxes, means intermediate and adjacent the other ends of said frames and coacting therewith to raise and lower said main frame relative to said other end of said center frame, and power means on said main frame for driving said drive shaft.

3. A loading machine having a pair of elongated, spaced, parallel and normally vertical side members, a center frame extending between said side members and secured thereto, an axle journal box rotatably mounted on said center frame at one end and adjacent each side thereof, an elongated hollow tubular sleeve rotatably supported within each of said journal boxes, an elongated drive shaft disposed within said sleeves and extending transversely of said center frame, a plurality of gear teeth formed on one end of each of said sleeves, an elongated tubular clutch sleeve mounted on said shaft adjacent said one end of said sleeves, each of said clutch sleeves having a plurality of gear teeth formed thereon and juxtaposed with respect to said gear teeth formed on said first-named sleeves means connecting each of said clutch sleeves for rotation with said shaft, said clutch sleeves being shiftable longitudinally of said drive shaft, power means connected with said drive shaft, means connecting the other end of said first-named sleeves with said traction means, means for selectively or simultaneously effecting the engagement or disengagement of said gear teeth on said clutch collars with said gear teeth formed on said first-named sleeves to effect a driving relationship between said drive shaft and said sleeves, an elongated main frame having one of its ends connected to said journal boxes, and means intermediate and adjacent the other ends of said main frame for raising and lowering said other end of said main frame relative to said center frame.

4. A loading machine comprising a pair of elongated, spaced, parallel and normally vertical side members, a center frame extending between said side members and secured thereto, traction means supported on said side members, an axle journal box mounted for rotation relative to said center frame adjacent each side and at one end thereof, an elongated tubular sleeve mounted for rotation within each of said journal boxes, a drive shaft disposed within said sleeves, said drive shaft extending transversely of said center frame, means connecting said sleeves with said traction means, clutch means connecting said drive shaft with said sleeves, an elongated main frame, means connecting one end of said main frame with said journal boxes, means intermediate and adjacent the other ends of said frames and coacting therewith to raise and lower said other end of said main frame relative to said other end of said center frame, means limiting the degree of pivotal movement between said frames, and power means on said main frame for driving said drive shaft.

5. A loading machine comprising an elongated center frame, traction means supporting the center frame, a journal box mounted for rotation on said center frame at one end thereof and adjacent each side thereof, a shaft journaled in said journal boxes and extending transversely of said center frame, an elongated main frame, means connecting one end of said main frame with each of said journal boxes, means intermediate the other ends of said frames for relatively swinging one of the frames about the shaft, and power means on the main frame connected with said traction means.

6. A loading machine comprising an elongated center frame, traction means supporting the center frame, a drive shaft extending transversely of the center frame adjacent one end thereof, an elongated main frame, means pivotally supporting the main frame on the center frame about the drive shaft, power means on the main frame connected with the drive shaft, and tubular driving sleeves surrounding the drive shaft and operatively connecting said drive shaft with the respective traction means.

7. A loading machine comprising an elongated center frame, traction means supporting the center frame, a drive shaft extending transversely of the center frame adjacent one end thereof, an elongated main frame, means pivotally supporting the main frame on the center frame about the drive shaft, power means on the main frame connected with the drive shaft, tubular driving sleeves surrounding the drive shaft, clutch means operatively connecting each of the driving sleeves with the drive shaft, brake means connected with the driving sleeves, and means connecting the driving sleeves with the traction means.

References Cited in the file of this patent

UNITED STATES PATENTS

| | | |
|---|---|---|
| 1,138,453 | Casteran | May 4, 1915 |
| 1,403,258 | Lewis | Jan. 10, 1922 |
| 1,498,506 | Buffum | June 17, 1924 |
| 1,721,667 | Moore | July 23, 1929 |
| 1,796,943 | Pratt | Mar. 17, 1931 |
| 1,878,037 | Vodoz | Sept. 20, 1932 |
| 2,100,336 | Joy | Nov. 30, 1937 |
| 2,139,198 | Miller | Dec. 6, 1938 |
| 2,263,701 | Jeffrey | Nov. 25, 1941 |
| 2,355,234 | Nickles | Aug. 8, 1944 |
| 2,367,784 | Knoizen et al. | Jan. 23, 1945 |
| 2,372,311 | Brown | Mar. 27, 1945 |
| 2,437,629 | Whaley | Mar. 9, 1948 |
| 2,588,328 | Schick | Mar. 4, 1952 |
| 2,611,442 | Thomas | Sept. 23, 1952 |